United States Patent [19]

Becker et al.

[11] 4,209,749
[45] Jun. 24, 1980

[54] RAILWAY COMMUNICATION SYSTEM

[75] Inventors: Friedbert Becker; Peter Kloeber; Johann A. Steinkamp, all of Munich, Fed. Rep. of Germany

[73] Assignee: Siemens Aktiengesellschaft, Berlin & Munich, Fed. Rep. of Germany

[21] Appl. No.: 825,819

[22] Filed: Aug. 19, 1977

[30] Foreign Application Priority Data

Sep. 30, 1976 [DE] Fed. Rep. of Germany ....... 2644206

[51] Int. Cl.² .............................................. H04B 7/20
[52] U.S. Cl. ...................................... 455/56; 455/17; 340/47
[58] Field of Search ...................... 325/51, 52, 53, 54, 325/55, 56, 57, 1,3,4,5,64,302,31; 340/47, 49, 146.1 C

[56] References Cited

U.S. PATENT DOCUMENTS

| | | | |
|---|---|---|---|
| 2,896,072 | 7/1959 | Bachelet et al. | 325/53 |
| 2,904,674 | 9/1959 | Crawford | 325/52 |
| 3,517,315 | 6/1970 | Malm | 325/54 |
| 3,539,524 | 10/1970 | Daskalakis et al. | 325/53 |
| 3,555,424 | 1/1971 | Malm | 325/53 |

OTHER PUBLICATIONS

Sicarid-TCL A New Microwave System for the Transfer of Informations from the Track to the Wagon in Railway Networks, Becker & Mermolia, Sep. 1975.

Primary Examiner—Benedict V. Safourak
Assistant Examiner—Tommy P. Chin
Attorney, Agent, or Firm—Hill, Van Santen, Steadman, Chiara & Simpson

[57] ABSTRACT

In one illustrated embodiment involving a railway communication system, about ten send-receive stations form a transmission section operating at one pair of frequencies in the range above one gigahertz, the stations being arranged at about one kilometer intervals along the route for radio communication with mobile stations moving therealong. A next succeeding similar transmission section operates at a different pair of send and receive frequencies above one gigahertz. All of the stations of a given transmission section may be in communication with a main station by means of a parallel cable connection. A central station then may communicate with mobile stations via the respective main stations. In another embodiment, the stations are implemented as microwave relay stations linked to a main station by the same antenna system used for communication with the mobile stations. In either case, the mobile stations are suitably switched from one pair of send-receive frequencies to another as the vehicles of the system move from one transmission section to another along the route.

8 Claims, 4 Drawing Figures

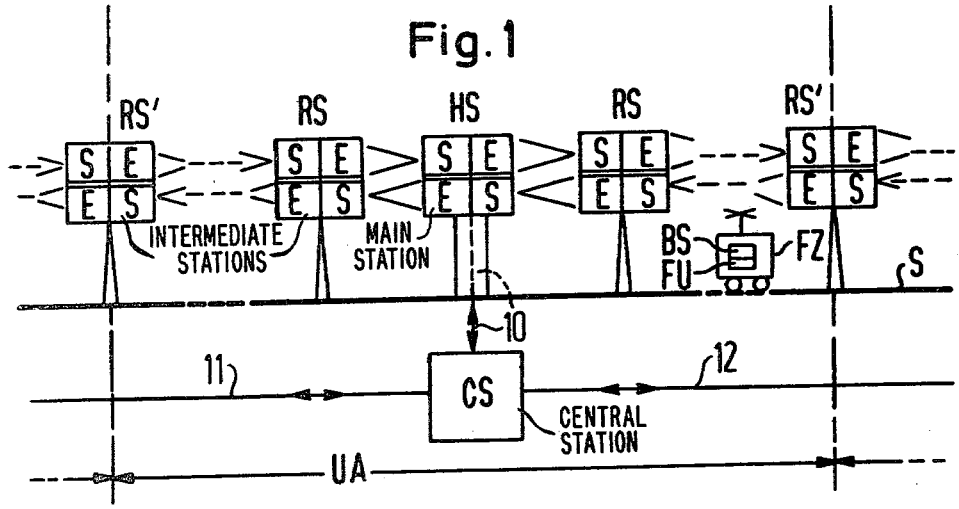
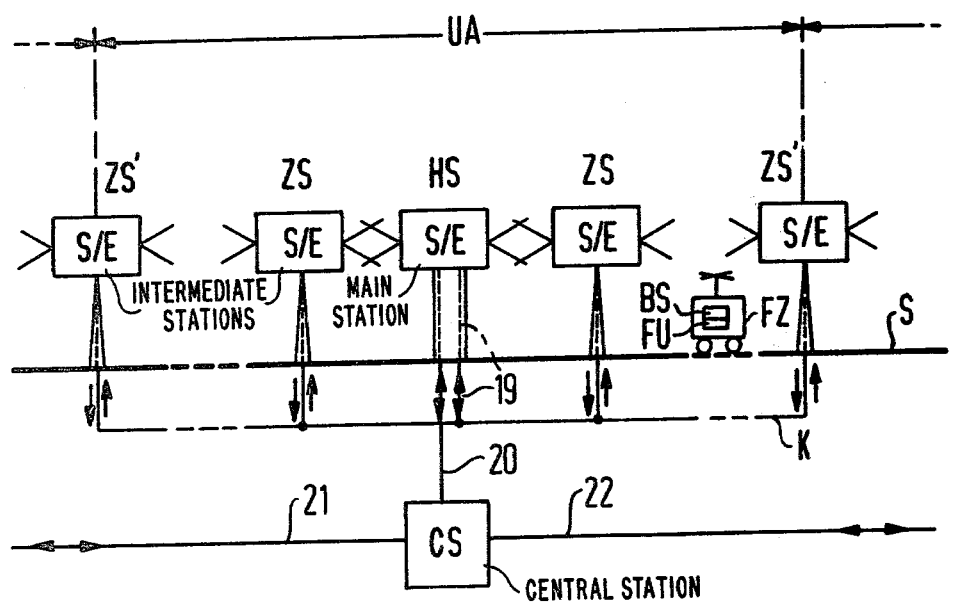

RAILWAY COMMUNICATION SYSTEM

BACKGROUND OF THE INVENTION

The invention relates to a radio system for communication transmission between transmitting-receiving stations moving along prescribed paths and transmitting-receiving stations effective in both the path directions, arranged at prescribed distances alongside of these paths, in which the stations of a path are in communication with a central transmitting-receiving station.

Radio systems of this type have particular importance in railroad systems. The economical utilization of existing rail networks and the high density of the train sequence at the high velocities desired in this context make an increasing data and signal exchange between the trains and the stationary dispatch facilities necessary.

From the publication "Electric Rails" 44 (1973) Vol. 4, pages 83–92 it is known to carry out the information exchange with the aid of a so-called track conductor system. In a track conductor system inductive wire coils are laid out in the track area which are effective as transmitting-receiving antennae for the stationary facilities. The transmission of information between the mobile transmitting-receiving stations on the trains and these stationary facilities proceeds with the aid of frequency keying in the frequency range of about 50 kHz, whereby the maximal transmission rate is limited to about 1200 baud. Aside from this limitation on the rate of the information flow, the track conductor system has the great disadvantage that the wire coils are exposed to the danger of mechanical damage to a large extent, particularly with track superstructure operations.

The danger of mechanical damage can be prevented in such a radio system in that one avoids the transmission with the aid of inductive coils and that the stations in contact with one another exchange their information via radio. Such systems are known, for example, through U.S. Pat. No. 3,517,315. The frequencies utilized therefor lie in the range below one gigahertz (1 GHz). The confinement of radio emission so as to be suited for communication transmission systems operating over substantial distances can only be insufficiently realized in this frequency range. As consequence therefrom results an increased danger of reciprocal interference among the radio services operating in this frequence range. Moreover, the shortage of frequencies available in this range again and again causes considerable difficulties in the construction of networks. The difficulty in the confining of the radio emission of the stations in contact with one another results furthermore in many reflections (because of mountains, buildings, trees, etc.) stemming from outside of the connection direction prescribed. The superpositions of the direct and the reflected emission lead to level breakdowns (response drop-offs) at the receiving station; said level breakdowns are sometimes very deep and may extend at least partially along the path. This phenomenon has to be sometimes taken into consideration in the mobile stations by means of a very expensive receiver technique (diversity technique).

SUMMARY OF THE INVENTION

The invention has the underlying objective to disclose an additional resolution for a radio system of the initially described type, which exhibits, on one hand, the advantages of the radio systems vis-a-vis the track conductor systems and overcomes moreover the difficulties exhibited in known radio systems because of insufficient confinement of the radio frequency signals to the desired transmission paths.

Proceeding from a radio system for communication transmission between transmitter-receiver stations moving along prescribed routes, and transmitter-receiver stations effective in both the route directions arranged at prescribed distances along these routes, with the stations of a route being in communication with a central transmitter-receiver station, this task is resolved in accordance with the invention in that the path sections between the consecutive stations representing main stations are subdivided by intermediate stations, that the main stations, furthermore, are combined into transmission sections with the intermediate stations which are closest in regard to distance, and that the intermediate stations together with the appertaining main stations represent the remote stations for signal exchange with the mobile stations, and that in adjoining transmission sections different transmitter-receiver frequencies in the range above one gigahertz (1 GHz) are used.

A good confinement of the radio emission with relatively little expense can be attained when transmitter- and receiver frequencies of above one gigahertz are used, as extensive distance measurements and experiments underlying the invention have shown. As a consequence thereof there results not only a strong reduction of undesired reflections but also a transmission essentially free of refraction phenomena of the emission and essentially delimited to the optical view. In other words, difficulties in connection with phenomena of the so-called over-the-horizon type practically do not occur at all.

In a first preferred embodiment, the signal exchange between a main station and the intermediate stations assigned to said main station is carried out via connection cables, and indeed in the form of a parallel circuit of the input-or of the output connection, respectively, of the main station with the output-or input connections, respectively, of the intermediate stations.

In an additional preferred embodiment of the subject of the invention, the intermediate stations are carried out as relay stations and represent signal transmission links to and from the main stations respectively assigned to said intermediate stations.

Particularly advantageous operating conditions result when the reciprocal distance of two consecutive stations alongside of the path and guaranteeing the optical view amounts to an average of about one kilometer (1 km), and the reciprocal distance of two consecutive main stations amounts to an average of about ten kilometers (10 km). The signal transmission thereby proceeds in the radio frequency plane in the range of between about ten and forty gigahertz (10 and 40 GHz).

The signal exchange expediently proceeds between the mobile stations and the main and intermediate stations representing the transmission sections, under utilization of the time multiplex technique in the multiple access mode with a rigid time frame and an address-channel-synchronization. In this manner a high density of the information to be transmitted can be attained, and indeed with optimal flexibility in regard to the chronologically fluctuating amount of information flow. The addressing thereby can be implemented as local-or also as individual address.

It is also advantageous in this context to carry out the transmission of the signals digitally, for example, in the form of phase-or frequency-keyed carrier oscillations.

As over-the-horizon conditions practically do not occur above one gigahertz (1 GHz) by means of refracting the wave fronts of the radio emission, merely two pair of different transmitter-receiver frequencies can be used for all transmission sections in an extremely advantageous manner. The reciprocal decoupling of the consecutive transmission sections alongside of the path is thereby carried out by the alternative exchange of the two frequency pairs from transmission section to transmission section. The mobile stations exhibit a frequency switching device for an automatic frequency pair exchange in their transit into the respective next transmission section.

The frequency switching device can use the receiving level as criterion for the switching. Instead, however, said frequency switching device can also be advantageously operated by an external switching means, for example, by control signal generators arranged at the transitions between two transmission sections alongside of the path.

Other objects, features and advantages of the invention will be apparent from the following detailed description taken in connection with the accompanying drawings.

BRIEF DESCRIPTION OF THE DRAWINGS

FIG. 1 shows the schematic illustration of an inventive sample embodiment of a radio system;

FIG. 2 shows the schematic illustration of a second inventive sample embodiment of a radio system;

DETAILED DESCRIPTION OF THE PREFERRED EMBODIMENTS

Figure 3:
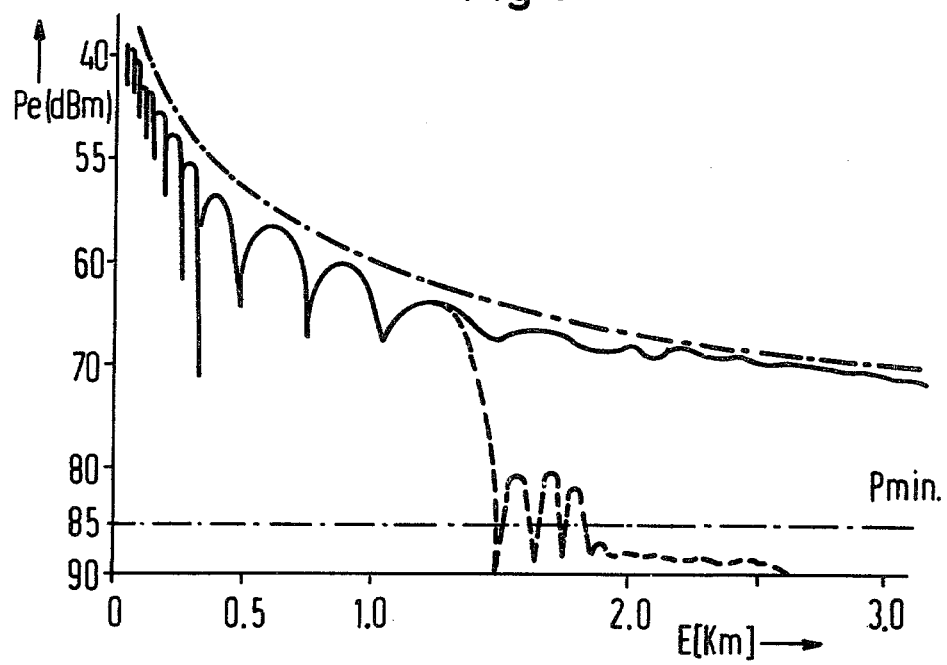
FIG. 3 illustrates a typical receiving level diagram for a radio system in accordance with FIGS. 1 and 2.

The radio system in accordance with FIG. 1 is subdivided alongside of the transmission path S into transmission sections UA. Each transmission section exhibits a main station HS with the main stations succeeding one another at a distance of about ten kilometers (10 km) alongside of the path. The main stations HS again are connected with a central station CS via lines or via radio. Such communication links are indicated at 10, 11 and 12 in FIG. 1 and extend between each main station HS and central station CS. Intermediate stations implemented as relay stations RS, are arranged between the main stations HS, of which the relay stations RS which are the closest to a main station HS in regard to distance are respectively assigned to said main station and jointly form the transmission section UA. Transition stations RS' may also be implemented as relay stations. The transmission of the signals proceeds digitally. The amount of the information flow is about ten kilobits per second (10 kbit). The information flow can be increased to thirty kilobits per second (30 kbit) maximal when a transit time compensation within a transmission section UA, in relation to the main station, is used.

The relay stations RS assigned to each main station HS along with the adjacent transition stations RS' form a signal transmission link to and from the main station HS assigned to them. Said signal transmission link simultaneously represents, together with the main station HS, the remote stations for the signal exchange with the mobile station BS assigned to the vehicle FZ having the frequency switching device FU. The main stations HS and the relay stations RS and transition stations RS' for this reason, respectively comprise a transmitter S and a receiver E for each transmission direction. The relay stations RS' at the transition points between two transmission sections UA differ from the remaining relay stations RS in that each of the two transmitter-receiver pairs of these relay stations make use of a different frequency pair dependent upon the direction in which a signal is being transmitted or from which a signal is being received. The corresponding facts hold true in regard to two consecutive main stations.

The main stations HS, furthermore, differ from the relay stations RS in that they are additionally connected with the central station CS (via links such as 10, 11 and 12) for information exchange therewith. The information conveyed by the central station CS is emitted to the adjacent relay stations from the main station HS in both directions so as to be further relayed to other intermediate stations and to the receivers of the transition stations of the associated transmission section which operate at the given assigned transmission frequency for that section. Said relay stations transmit such information in accordance with the organization of the transmission link. The information transmitted by the mobile station BS is conveyed to the main station HS via the relay station situated closest to said main station and then conveyed to the central station CS by said main station. If the station currently nearest to a mobile station BS is a main station HS, the information is directly passed on to the central station CS via the link (such as 10, 11 or 12) from such main station. The construction of the main stations and of the relay stations can be carried out in conventional technique as they have been known for a long time for intermediate points for directional radio paths. The modulation technique can be analog or digital. Expediently it is digital, and indeed in the form of frequency-or phase-keyed carrier oscillations. In this context only the exemplary publication William R. Bennett, James R. Davey: "Data Transmission," McGraw-Hill Book Company, New York, San Francisco, Toronto, London, Sydney, Inter-University Electronics Series Vol. 2, 1965 is pointed out which deals extensively with this technique.

The sample embodiment in accordance with FIG. 2 differs from the sample embodiment in accordance with FIG. 1 in that there the intermediate points ZS and the transition stations ZS' assigned to the main station HS receive the information (which is to be transmitted to the mobile stations with the transmitter-receiver devices S/E) via the connection cable K and transmit via the same cable also information received (by devices S/E) from the mobile station BS of the vehicle FZ to the main station HS. Thereby the output connections of all intermediate stations ZS and transition stations ZS' assigned to the main station HS are connected in parallel fashion to the input connection of the main station. The corresponding facts hold true in regard to the input connections of the intermediate and transition stations and the output connection of the main station. The cable section of cable K leading to the illustrated main station HS is designated by reference numeral 19 in FIG. 2. Further cables K (not shown) connect the adjacent main stations with the transition stations ZS' in the given embodiment. Moreover, the same subjects or disclosures in accordance with FIG. 1 are provided with the same reference symbols in FIG. 2 so that further comments to the sample embodiment in accordance with FIG. 2 can be spared. The communication links between main stations HS and central station CS are indicated at 20, 21 and 22 in FIG. 2.

As was already stated, the radio system in accordance with the invention particularly distinguishes itself by means of the utilization of carrier frequencies of above one gigahertz (1 GHz). In this frequency range increasingly quasi-optical transmission conditions are present so that consecutive stationary stations alongside of the path have to operate in optical view of one another (within line of sight distances of each other), and indeed with sufficient level reserve in regard to rain attenuation. Experiments with the path-network of the Federal Railway System have shown that typical distances of two consecutive stationary stations of 0.5 through one kilometer (0.5 through 1 km) result under consideration of the rain attenuation and the route guidance.

FIG. 3 illustrates a typical variation of the receiving level Pe in the frequency range of between 20 and 30 GHz, as a function of distance E between transmitting and receiving stations. In close range up to five hundred meters (500 m) one can recognize strongly formed minima (15 through 25 dB reductions), which are formed by superposition of a direct beam and a beam reflected by the ground. In the medium range of 0.5 to 1.5 kilometers (0.5 to 1.5 km) these level minima only amount to 10 to 15 dB reductions as in each case several components of indirect radiation take part in the superposition with the direct radiation. In the distant range above 1.5 kilometers (1.5 km), the level breakdowns (reductions) become increasingly smaller, and the measuring curve (stretched-out solid line) approaches the theoretical propagation curve (indicated by a dash-dot line). As the receiver reserve, present in each case, is sufficient for the close-and medium range to bridge this level minima, an assured transmission is guaranteed with the system suggested.

As soon as the optical view or line of sight relationship is not provided any longer between the antennae of two stations in signal exchange with one another, the sharp directionality of the antennae, combined with the small defraction inclination of the wave fronts of the transmitted radiation has the consequence that the receiver level rapidly falls to negligibly small values. The level diagram of FIG. 3 illustrates this strong decrease by a dash line falling below the minimal level Pmin.

Figure 4:
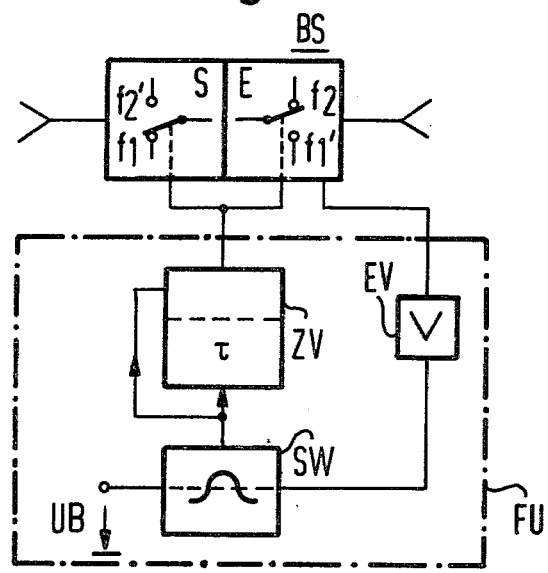
FIG. 4 shows an illustrative circuit for frequency switching device FU of FIGS. 1 and 2.

In FIGS. 1 and 2, the frequency switchover installations FU shown in FIG. 4 comprises a receiver EV for detecting the levels of the two transmitted carrier frequencies $f_1$ and $f_2$ of successive transmission sections UA. The respective carrier levels of the received frequencies $f_1$ and $f_2$ are supplied to a respective threshold value circuit SW which compares the received level with a selected reference level UB exceeding the necessary level for reliable reception. The threshold value circuit when triggered by the required carrier frequency level supplies its comparison output signal via a time delay circuit ZV which requires that the comparison output signal be continuously present for a predetermined time interval before a control signal is transmitted by the time delay circuit to the mobile station BS to effect switchover to a new reception frequency (e.g. $f_2$) and the associated transmission frequency (e.g. $f_2'$) for communication with the new transmission section. The time delay intervals are selected in relation to the selected reference values to provide reliable operation over the range of operating conditions of interest, and to avoid repeated switching of station BS as it enters a new transmission section. If desired a further timer may prevent a second switchover of the station BS for a selected time interval which takes account of the minimum time for a vehicle FZ to traverse a transmission section.

The term "transition station" does not require a station which is part of two successive transmission sections, since for example the illustrated transition stations could each be divided into separate transition stations each associated with only one transmission section.

If the frequency switchover installation FU is to be actuated by external switchover means, this expediently takes place in each track section via a Sicarid-point; i.e., by means of a sicarid-system, such as e.g. is published in Proc. 5th European microwave conference, Hamburg, September 1975, F. Becker, M. Mermolia: "Sicarid TC, A New Microwave System for the Transfer of Information from the Track of the Wagon in Railway Networks."

Transition stations RS' and ZS' may be considered to each include a Sicarid-point of this type in the form of an answering device in FIGS. 1 and 2.

It will be apparent that many modifications and variations may be effected without departing from the scope of the novel concepts of the present invention.

We claim as our invention:

1. A radio system for communication transmission between mobile send-receive stations moving along a prescribed route, and send-receive stations arranged along the route at prescribed distances and effective in both route directions, and a central station for two-way communication with said send-receive stations; characterized in that the send-receive stations of the route are arranged in successive transmission sections (UA), said transmission sections (UA) having respective main send-receive stations (HS) connected with said central send-receive station (CS) and having respective series of intermediate send-receive stations (RS, ZS) adjacent the respective main send-receive stations (HS) in regard to distance and covering successive segments of the route between the successive main stations (HS), and having communication with the central station (CS) via the respective associated main send-receive station (HS), the main send-receive station (HS) and the adjacent series of intermediate stations (RS, ZS) forming each transmission section (UA) representing the send-receive stations for signal exchange with the mobile receive stations (BS) as the mobile stations traverse such transmission section (UA); that for all transmission sections (UA) only two pairs of different send-receive frequencies in the range above one gigahertz especially between about ten and about forty gigahertz are used; that along the route, the distance between each two consecutive stations of each transmission section (UA) amounts to a mean value of about one kilometer so as to guarantee operation of the successive stations within line of sight distances of each other, and the distance between two consecutive main stations (HS) amounts to a mean value of ten kilometers; that successive transmission sections (UA) along the route use alternately different pairs of said send-receive frequencies for reciprocal decoupling of the successive transmission sections (UA); and that the mobile stations (BS) each have a frequency switching device (FU) for an automatic change from one of said pairs of send-receive frequencies to the other during the transition from signal exchange with one transmission section (UA) to signal exchange with the next transmission section (UA).

2. A radio system in accordance with claim 1, characterized in that the signal exchange between a main station (HS) and the intermediate stations (ZS) assigned to said main station is undertaken via connection cables (K), in the form of a parallel circuit with one of the inputs of the main station being connected with one of the outputs of the intermediate stations, and with the output of the main station being connected with the inputs of the intermediate stations.

3. A radio system in accordance with claim 1, characterized in that the intermediate stations comprise relay stations (RS) and represent signal transmission links to and from the main stations (HS), respectively assigned to said intermediate stations.

4. A radio system in accordance with claim 1 characterized in that the distance between each two consecutive stations of each transmission section guarantees an optical view therebetween, such distances between stations of each transmission section having a mean value of about one kilometer, and the distances between main stations of successive transmission sections having a mean value of about ten kilometers, signal transmission in the respective transmission sections proceeding in the radio frequency spectrum in the range between about ten gigahertz and about forty gigahertz.

5. A radio system in accordance with claim 1, characterized in that signal exchange between mobile stations (BS) and the stations (HS, ZS, RS) of the successive transmission sections is carried out under utilization of the time multiplex technique in multiple access with rigid time frame and with an address-channel synchronization.

6. A radio system in accordance with claim 5, characterized in that the addressing can be represented as local and also as individual address.

7. A radio system in accordance with claim 1 characterized in that the transmission of the signals in the successive transmission sections is carried out digitally, in the form of phase-or frequency-keyed carrier oscillations.

8. A radio system in accordance with claim 1, characterized in that external switching means is associated with transition stations (RS', ZS') between the successive transmission sections (UA) for actuating the frequency switching devices (FU) of each mobile station (BS).

* * * * *